United States Patent [19]

Milo

[11] 3,709,240

[45] Jan. 9, 1973

[54] FROST HEAVE-PROTECTED SHUT-OFF VALVE WITH LOCKABLE NIPPLE

[75] Inventor: August Milo, Hillside, N.J.

[73] Assignee: Universal Valve Company, Inc., Elizabeth, N.J.

[22] Filed: Jan. 6, 1971

[21] Appl. No.: 104,442

[52] U.S. Cl. .................... 137/68, 285/302, 285/321
[51] Int. Cl. ........................ F16l 27/12, F16k 17/36
[58] Field of Search ................ 137/68; 285/302, 321

[56] References Cited

UNITED STATES PATENTS

| | | | |
|---|---|---|---|
| 2,944,840 | 7/1960 | Wiltse | 285/321 |
| 3,515,157 | 6/1970 | Milo | 137/68 |
| 3,532,367 | 10/1970 | Roos | 285/302 |

Primary Examiner—Martin P. Schwadron
Assistant Examiner—Richard Gerard
Attorney—Peter J. Gaylor

[57] ABSTRACT

A frost heave-protecting shut-off valve consists of a lower body portion having a lever-connected valve flap connectable to a fusible link mounting designed to hold the flap normally open. A bonnet portion is attached to the upper part of the body and it has a shear groove connecting with the link, and a circumferential groove and a retaining ring in the circumferential groove. A sealing sleeve having a threaded sealing union member at its lower end is connected in slidable and sealing engagement with the bonnet portion. The union member has a flange designed to stop further upward movement of the sleeve when the flange engages the ring. A nipple, having its lower end slidably engaged in the upper portion of the sleeve, and serving as the valve outlet, also has a circumferential groove on its portion within the sleeve. The sleeve also has a threaded sealing union member at its upper end in slidable and sealing engagement with the nipple end, and the union member also has a flange. A spring retaining ring is disposed around the nipple and is retained by the latter flange in a manner such that, in the event the nipple is pulled out of the sleeve until the nipple groove reaches the spring ring, the latter ring will snap into the nipple groove and lock the nipple against any further upward movement.

1 Claim, 2 Drawing Figures

INVENTOR.
AUGUST MILO

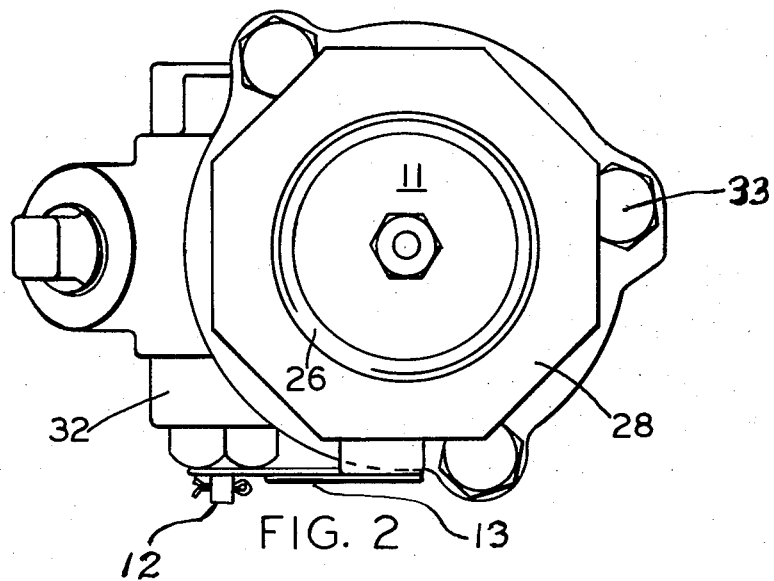

FROST HEAVE-PROTECTED SHUT-OFF VALVE WITH LOCKABLE NIPPLE

BACKGROUND OF THE INVENTION

This invention relates to the locking of a telescoping nipple connected to the outlet bonnet portion of a shut-off valve, such as that connected between an underground gasoline tank pump and a dispenser unit located above ground. In such cases, the gasoline pump feeds the gasoline from the underground tank, through an underground shut-off valve, the outlet of which is connected, in telescoping arrangement, to a nipple located at least partially above ground and leading to the dispenser island. Such shut-off valves generally are provided with a shear groove in the bonnet portion and a fusible link having one end connected above the shear groove and designed to close the valve in the event of fire or impact shearing off the bonnet. Also, a sleeve connectable onto the bonnet portion allows an outlet nipple to slide therein in the event of a frost heave.

In the Milo U.S. Pat. No. 3,515,157, there is described a frost heave-protected shut-off valve of the type under discussion. This valve has an upper outlet bonnet portion which is locked onto the lower end of a sleeve in which a discharge nipple is disposed in slidable relation. The purpose of the sliding or telescopic effect is to enable the nipple to rise, independently of the valve in the event of a frost heave in cold weather, when the dispenser island may be raised because of the severe cold. There is a danger, however, that during excessively severe winter weather, it may be possible for the island to rise high enough as to pull out the nipple completely out of the sleeve. Such an occurrence would cause spillage of gasoline and would present a serious fire and explosion hazard.

SUMMARY OF THE INVENTION

According to the present invention, the pulling out of the nipple completely out of the sleeve is prevented by providing a circumferential groove on the outer periphery of the nipple, desirably below the center of the portion disposed within the sleeve, and providing a split spring metal ring within the upper union portion of the sleeve, said ring being designed to ride on the periphery of the nipple until the groove reaches the ring, whereupon the ring snaps into the groove and locks the nipple against any further independent upward movement thereof.

BRIEF DESCRIPTION OF THE DRAWINGS

The invention will be more readily understood by reference to the accompanying drawings, in which:

FIG. 2 illustrates a top or plan view thereof.

The same numerals refer to the same or similar parts in the various figures.

DESCRIPTION OF THE PREFERRED EMBODIMENTS

Figure 1:
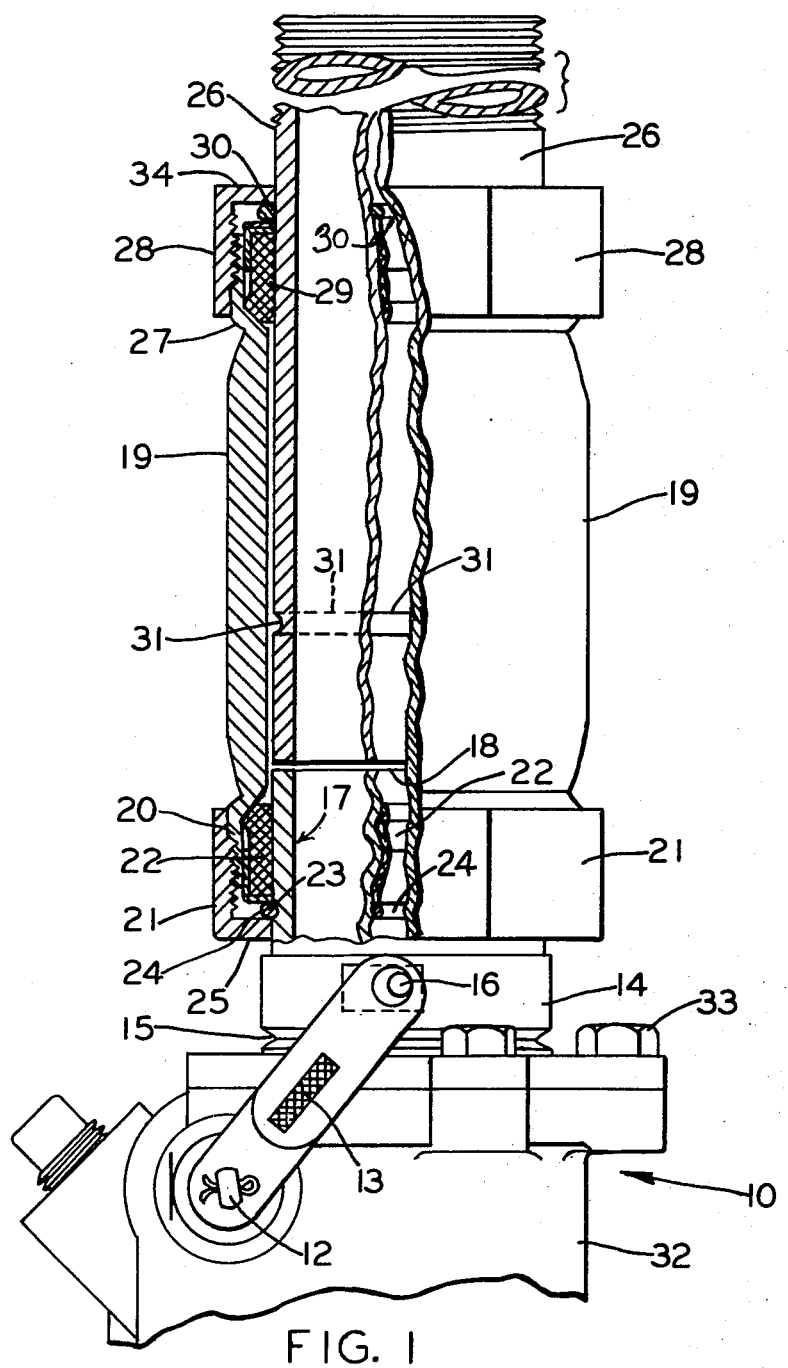
FIG. 1 depicts a vertical elevational view, partly in cross-section, of the essential features of the present invention.

Referring again to the drawings, numeral 10 indicates generally a valve, such as a flap shut-off valve described in detail in the Milo U.S. Pat. No. 3,515,157. It comprises a body 32, the upper outlet end of which is attached, by bolts 33, to the bonnet or adapter portion 17. Closure flap 11 of valve 10 is attached, in spring-loaded relation, to pivot pin 12, and is held in open position against the force of the spring by one end of fusible link 13. The other end of link 13 is attached to pin 16 projecting from upper outlet bonnet portion 14 of the valve. A circumferential shear groove 15 is provided below pin 16 so that, in the event portion 14 is sheared off, link 13 is freed and the spring-loaded flap 11 then closes the valve. Also, in the event of a fire, fusible link 13 melts and releases pivot 12, which also causes the closing of flap 11. The gasoline pump inlet is at the bottom of valve 10, and is not shown. The upper bonnet or adapter portion 17 of valve 10 extends upwardly for a short distance, terminating with edge 18.

There is slipped over the bonnet portion 17 of valve 10, a sleeve 19 having a lower threaded end 20, to which is screwed union fitting 21. A gasket 22 maintains the sleeve in sealed arrangement with respect to the outside. A circumferential groove 23 cut around the outside of bonnet portion 17, serves to accommodate a split spring ring 24 which projects beyond the outer periphery of bonnet portion 17. Lip 25 of union fitting 21 fits closely against bonnet portion 17 and thus is able to engage ring 24 which serves as a stop for union fitting 21.

A nipple 26 fits in slidable relation within sleeve 19 and serves as the outlet for the gasoline from valve 10 to the dispenser (not shown), located on ground level. The upper end 27 of sleeve 19 also is threaded, and an upper union fitting 28 is screwed thereon. Gasket 29 insures sealing of the joint with respect to the outside. Above gasket 29 is a split spring metal ring 30 which rides over the outer surface of nipple 26 and which is held in place by close fitting lip 34 of fitting 28.

A circumferential groove 31 is cut around the outer periphery of nipple 26, desirably below the center thereof. It will be noted that, when the dispenser pump island rises due to a frost heave, nipple 26 is pulled out of sleeve 19, which remains stationary. In very severe cold weather, it is possible that the dispenser island will rise to a point where there would be danger of pulling nipple 26 completely out of sleeve 19, thus causing gasoline to discharge to the surface.

HOwever, in the present case, as nipple 26 is raised, locking groove 31 is moved nearer ring 30 and, once it reaches this ring, the latter will snap into groove 31 and serve as a lock for nipple 26. Further upward independent movement of the nipple will be prevented by close-fitting flange or lip 34 of union fitting 28, which would lock against ring 30. The length of nipple 26 may vary, depending upon the tank, piping and island arrangements.

I claim:

1. A frost heave-protected shut-off valve, comprising:
    a lower body portion having a lever-mounted valve flap with spring bias designed to hold said flap normally closed and connectable to one end of a fusible link mounting designed, when engaged, to hold said flap normally open,
    a bonnet portion attached to the upper part of said body and having a shear groove and engaging means thereon above said groove for engaging the other end of said link and having a circumferential groove above said engaging means and a retaining ring disposed therein, a sealing sleeve having a lower threaded sealing union member at its lower end in slidable and sealing engagement with said bonnet portion, said union member having a lip designed to stop further upward movement of said sleeve when said lip engages said ring, a nipple having its lower end slidably engaged in the upper portion of said sleeve above said bonnet portion and serving as the valve outlet and having a narrow circumferential groove on its portion within said sleeve, said sleeve also having an upper threaded sealing union member at its upper end in slidable and sealing engagement with said nipple end, and said upper union member also having a stopping lip, and a spring retaining ring disposed around said nipple in spaced relation with said nipple groove and retained within said upper union member and held by said latter lip in engagable relation with said nipple groove in a manner such that, in the event said nipple is slid out of said sleeve by a frost heave until said nipple groove reaches said spring retaining ring, said latter ring will snap into said nipple groove, whereby said nipple becomes locked against further upward movement.

* * * * *